United States Patent
Albers et al.

(10) Patent No.: US 6,689,505 B1
(45) Date of Patent: Feb. 10, 2004

(54) ELECTROCATALYST FOR FUEL CELLS

(75) Inventors: Peter Albers, Hanau (DE); Emmanuel Auer, Frankfurt (DE); Walther Behl, Blankenbach (DE); Karl Vogel, Alzenhau-Michelbach (DE); Conny Vogler, Bornheim-Sechtem (DE)

(73) Assignee: dmc² Degussa Metals Catalysts Cerdec AG, Frankfurt am Main (DE)

( * ) Notice: Subject to any disclaimer, the term of this patent is extended or adjusted under 35 U.S.C. 154(b) by 201 days.

(21) Appl. No.: 09/648,343

(22) Filed: Aug. 25, 2000

(30) Foreign Application Priority Data

Aug. 27, 1999 (EP) .............................. 99116926

(51) Int. Cl.⁷ .................... H01M 4/96; H01M 4/88; B01J 21/18
(52) U.S. Cl. .................. 429/44; 502/101; 502/180; 502/185
(58) Field of Search ............... 429/44; 502/101, 502/180, 185

(56) References Cited

U.S. PATENT DOCUMENTS 5,068,161 A * 11/1991 Keck et al. .................. 429/44
5,614,460 A * 3/1997 Schwarz et al. ........ 502/180 X
5,759,944 A * 6/1998 Buchanan et al. .......... 502/185

FOREIGN PATENT DOCUMENTS

EP 0 827 225 3/1998
EP 0 872 096 10/1998

OTHER PUBLICATIONS

Albers et al. Chemical Abstract No. 2001:152337 Feb. 2001.*

* cited by examiner

Primary Examiner—Stephen Kalafut
(74) Attorney, Agent, or Firm—Kalow & Springut LLP

(57) ABSTRACT

Electrocatalyst which are formed of a carbon support, which is a carbon black with an H content of >4000 ppm and, as the catalytically active component, platinum or bi- or multi-metallically doped or alloyed platinum. The electrocatalysts are prepared by deposition of noble metals on the carbon black surface. They can be used for the production of fuel cells.

12 Claims, 6 Drawing Sheets

ELECTROCATALYST FOR FUEL CELLS

INTRODUCTION AND BACKGROUND

The present invention relates to an electrocatalyst and a process for its preparation and its use in fuel cells.

Platinum catalysts and alloyed platinum catalysts on electrically conductive carbon supports are employed as electrocatalysts for anodes and/or cathodes in low-temperature fuel cells, preferably in phosphoric acid fuel cells (Phosphoric Acid Fuel Cell, PAFC), polymer electrolyte membrane cells (Polymer Electrolyte Membrane Fuel Cell, PEMFC) and direct methanol fuel cells (Direct Methanol Fuel Cell, DMFC). Typical fuels which are employed are oxygen or air on the cathode side and hydrogen, hydrocarbons, such as e. g. methane, oxygen-containing hydrocarbons, such as e. g. alcohols, or reformed products thereof on the anode side. The platinum loading is in the range of 5–80 wt. %, preferably in the range of 10–50 wt. %, based on the total weight of the catalyst. Carbon blacks, graphitized carbon blacks, graphite, carbides and physical mixtures thereof are used in particular as electrically conductive carbon supports, depending on the electrode side.

It is known that the electrical output achieved by a low-temperature fuel cell (e. g. PAFC, PEM FC, DMFC) substantially depends on the activity of the cathode catalyst for the oxygen reduction reaction (ORR=oxygen reduction reaction) and the tolerance of the anode catalyst to the reformed product or CO. A maximum current density at a given voltage and only a very low voltage drop during the operating time of the fuel cell catalyst are therefore particularly worthwhile aims. This leads to an optimum efficiency of the fuel cells and to decreasing costs per current unit generated.

Platinum catalysts or bi- and multi-metallic platinum catalysts on electrically conductive support materials, such as e. g. carbon blacks or graphitized carbon blacks, have proved to be suitable catalysts with good output data. Furnace blacks, such as e. g. Vulcan XC-72 from Cabot Inc. (Massachusetts), or acetylene blacks, such as e. g. Shawinigan Black from Chevron Chemicals (Houston, Tex.), are chiefly described as standard support materials in the literature.

U.S. Pat. No. 5,759,944 describes the use of Vulcan XC-72 and Shawinigan Black as supports for Pt, Pt—Ni and Pt—Ni—Au catalysts for fuel cells. The metals are deposited by suspension of the support material in water, subsequent hydrolysis or precipitation of the corresponding noble metal salts and non-noble metal salts and reduction with an aqueous reducing agent (e. g. formaldehyde). After filtration and drying of the catalyst, a thermal treatment in an inert or reducing atmosphere can follow.

U.S. Pat. No. 5,068,161 describes the preparation of Pt, Pt—Co—Cr and Pt—Mn cathode catalysts on Vulcan XC-72 and Shawinigan Black in an analogous manner.

The preparation of anode catalysts is described in EP 838 872 A2 in the form of bi- or multi-metallic Pt, Pt—Ru, Pt—Co—Mo and Pt—Ru—$WO_3$ catalysts. The aim of modification of the platinum catalyst with elements or compounds such as Ru, Mo or $WO_3$ is to improve the CO tolerance on the anode side of the PEM fuel cell. Vulcan XC-72 is employed as the standard support material, and the modification of the platinum catalyst with elements. compounds such as Mo or $WO_3$ is described as a two-stage process.

EP 0827 255 A2 describes the synthesis of supported electrocatalysts based on platinum or platinum alloys, the deposition of the alloy metals taking place in the form of a two-stage process. The platinum catalyst serving as the precursor for the base metal modification is prepared by precipitation of $H_2Pt(OH)_6$ on the carbon black supports Vulcan XC-72 and Shawinigan Black.

The use of acetylene blacks as standard supports for the preparation of platinum alloy catalysts for the cathode and anode is mentioned in U.S. Pat. No. 5,593,934 and EP 557 673. Both applications describe the synthesis of the platinum catalyst from hexachloroplatinic (IV) acid using sodium dithionite as a mild reducing agent.

All these known platinum or platinum alloy catalysts have the disadvantage that their electrochemical output when used in the fuel cell is limited.

An object of the present invention is to prepare an electrocatalyst which is more active than the known catalysts.

SUMMARY OF THE INVENTION

The above and other objects can be achieved according to the present invention by an electrocatalyst which comprises, as the carbon support, a carbon black with an H content of >4000 ppm, preferably >4200 ppm, particularly preferably >4400 ppm, as determined by CHN analysis, and, as the catalytically active component, platinum or bi- or multi-metallically doped or alloyed platinum.

Bi- or multi-metallically doped or alloyed platinum can be obtained by doping the platinum or alloys of platinum with the elements Ru, Sn, W, Mo, Fe, V, Mn, Co, Cr, Ni, Pd, Rh, Ir or combinations thereof.

The ratio of CTAB surface area (cetylammonium bromide) to BET surface area can be 0.9–1.1.

A CTAB/BET surface area ratio of the carbon black of close to 1 moreover allows highly disperse deposition of active metal components on the support without noble metal crystallites penetrating into the pores of the carbon black support and its specific metal surface no longer being accessible electrochemically.

A feature of the invention resides in the process for the preparation of an electrocatalyst as described above. In carrying out the process, the noble metal salt solution and optionally salt solutions of the doping or alloying elements are added simultaneously, in succession or in a two-stage process after prior preparation of a noble metal pre-catalyst to a suspension of a carbon black with an H content of >4000 ppm. The noble metal salt solutions are hydrolyzed using a basic compound and complete deposition of the noble metal and the other metals is carried out by reduction with a reducing agent.

According to another feature of this invention, gas diffusion electrodes can be made for the cathode or anode side of a membrane fuel cell, by depositing a porous catalyst layer of the aforementioned electrocatalyst on a hydrophobized conductive substrate material.

Still further, catalyst-coated proton-conducting polymer membranes can be made for membrane fuel cells, by depositing a catalytically active layer of the aforementioned electrocaalyst on the cathode and anode side.

Yet another feature of the invention concerns membrane electrode assemblies for membrane fuel cells which comprise a proton-conducting polymer membrane and gas diffusion electrodes which are located on both sides on the cathode and anode side. The catalyst layer on the cathode and anode side is formed of the electrocatalyst as described herein.

BRIEF DESCRIPTION OF DRAWINGS

The present invention will be further understood with reference to the accompanying drawings, wherein.

DETAILED DESCRIPTION OF INVENTION

Figure 1:
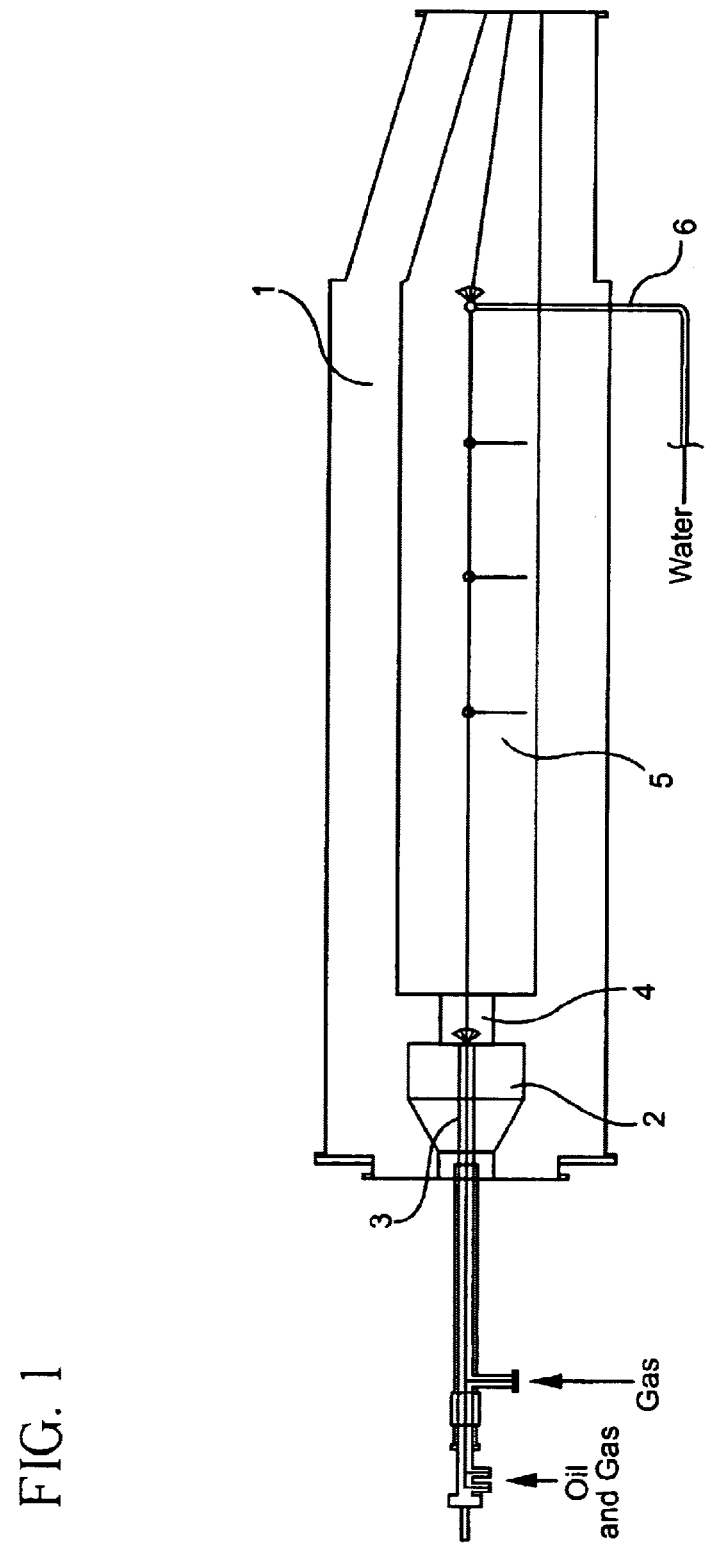
FIG. 1 is a schematic view of a reactor used to prepare carbon black for purposes of this invention.

The present invention will now be described in greater detail.

A carbon black with an H content of greater than 4000 ppm and a peak integral ratio, determined by inelastic neutron scattering (INS), of non-conjugated H atoms (1250–2000 $cm^{-1}$) to aromatic and graphitic H atoms (1000–1250 $cm^{-1}$ and 750–1000 $cm^{-1}$) of less than 1.22, preferably less than 1.20, can be employed as the carbon black with an H content of greater than 4000 ppm, determined by CHN analysis.

The furnace black is prepared in a carbon black reactor, which comprises a combustion zone, a reaction zone and a termination zone along the reactor axis, by generating a stream of hot waste gases in the combustion zone by complete combustion of a fuel in an oxygen-containing gas and passing the waste gas from the combustion zone through the reaction zone into the termination zone, mixing a carbon black raw material into the hot waste gas in the reaction zone and stopping the formation of carbon black in the termination zone by spraying in water, a liquid and gaseous carbon black raw materials being sprayed in at the same point.

The liquid carbon black raw material can be atomized by pressure, steam, compressed air or the gaseous carbon black raw material.

Liquid hydrocarbons burn more slowly than gaseous ones, since they must first be converted into the gas form, that is to say vaporized. As a result, the carbon black has contents formed from the gas and those formed from the liquid.

The so-called K factor is often used as a measurement value for characterizing the excess air. The K factor is the ratio of the amount of air required for stoichiometric combustion of the fuel to the amount of air actually fed to the combustion. A K factor of 1 therefore means a stoichiometric combustion. In the case of an excess of air, the K factor is less than 1. As in the case of known carbon blacks, K factors of between 0.3 and 0.9 can be used here. K factors of between 0.6 and 0.7 are preferably used.

Liquid aliphatic or aromatic, saturated or unsaturated hydrocarbons or mixtures thereof, distillates from coal tar or residual-oils which are formed during catalytic cracking of petroleum fraction or in olefin production by cracking of naphtha or gas oil can be employed as the liquid carbon black raw material.

Gaseous aliphatic, saturated or unsaturated hydrocarbons, mixtures thereof or natural gas can be employed as the gaseous carbon black raw material.

The process described is not limited to a particular reactor geometry. Rather, it can be adapted to various reactor types and reactor sizes. Both pure pressurized atomizers (one-component atomizers) and two-component atomizers with internal or external mixing can be employed as the carbon black atomizer, it being possible for the gaseous carbon black raw material to be used as the atomizing medium. The combination described above of a liquid with a gaseous carbon black raw material can thus be realized, for example, by using the gaseous carbon black raw material as the atomizing medium for the liquid carbon black raw material.

Two-component atomizers can preferably be employed for atomizing liquid carbon black raw material. While in one-component atomizers a change in throughput also leads to a change in droplet size, the droplet size in two-component atomizers can be influenced largely independently of the throughput.

The CTAB surface area can be from 20 to 200 $m^2/g$, preferably 20 to 70 $m^2/g$. The DBP number can be from 40 to 160 ml/100g, preferably 100 to 140 ml/100g.

A carbon black known from DE 19521565 can furthermore be employed as the carbon black with a hydrogen content of >4000 ppm, determined by CHN analysis.

The carbon blacks can be employed in untreated or after-treated form. The carbon black can be non-doped or doped with foreign atoms. Foreign atoms can be Si, Zr, Sb, V, Fe, Mg or Ti.

The very high hydrogen content is an indication of a severe disturbance in the carbon lattice due to an increased number of edges of the C crystallites, which are smaller compared with Vulcan XC-72 or acetylene blacks. The hydrogen content can be determined beyond doubt by neutron diffraction and indicates the existence of $sp^3$-hybridized C atoms, so-called defects in the crystallite lattice, on which platinum can be preferentially deposited.

For optimum functioning of the electrocatalysts according to the invention, the loading of the electrocatalyst can be between 5 and 80 wt. % platinum, preferably between 10 and 60 wt. % platinum, relative to the total weight of the electrocatalyst.

The atomic ratio between platinum and the other doping or alloying components of which there are optionally several can be between 9:1 and 1:9, but preferably between 5:1 and 1:5.

In the case of tri- or multi-metallic electrocatalysts, the atomic ratio of the further alloying components with respect to one another can be varied within the limits of between 10:0 and 0:10. However, atomic ratios within the limits of 3:1 and 1:3 are particularly advantageous.

The invention also provides a process for the preparation of the electrocatalyst according to the invention, characterized in that noble metal salt solution and optionally salt solutions of the doping or alloying elements are added simultaneously, in succession or in a two-stage process after prior preparation of a noble metal pre-catalyst to a suspension of a carbon black with an H content of >4000 ppm, the noble metal salt solutions are hydrolyzed using a basic compound and complete deposition of the noble metal and the other metals is carried out by reduction with a reducing agent.

The electrocatalysts according to the invention can be obtained by suspension of the carbon black in completely desalinated water, by hydrolysis or precipitation of suitable platinum salts, such as, for example, hexachloroplatinic (IV) acid, platinum nitrate, platinum sulfite acid or hexahydroxoplatinic (IV) acid, and subsequent reduction with suitable reducing agents, such as, for example, formaldehyde, sodium borohydride or hydrazine, by a wet chemistry method.

After the catalyst has been separated off by filtration, a drying step follows.

After the preparation of the electrocatalyst by a wet chemistry method, a heat treatment under an inert gas or a reducing atmosphere at temperatures between 0° C. and 1000° C., preferably between 1000° C. and 700° C., can be carried out.

The electrocatalyst according to the invention can be employed in gas diffusion electrodes for the cathode or anode side of a membrane fuel cell (for example PEM FC, DMFC) comprising a porous catalyst layer on a hydrophobized conductive substrate material. The gas diffusion electrode is employed on the cathode and anode side of a membrane electrode assembly for PEM or DM fuel cells which comprises a polymer membrane and gas diffusion electrodes on the anode and cathode side.

The electrocatalyst according to the invention can be employed as a catalytically active layer on the cathode and anode side of a catalyst-coated proton-conducting polymer membrane for membrane fuel cells.

The electrocatalyst according to the invention can be employed as the catalyst layer on the cathode and anode side of a membrane electrode assembly for PEM fuel cells which comprises a proton-conducting polymer membrane and gas diffusion electrodes which are located on both sides on the cathode and anode side.

All the electrocatalysts according to the invention are distinguished by a high dispersion of the metal particles deposited on the support and a higher-activity in the electrochemical full cell test compared with known electrocatalysts.

EXAMPLES

In the following examples and comparison examples, electrocatalysts according to the invention and comparison electrocatalysts are prepared and are compared with one another in respect of their electrochemical properties when used for fuel cells.

As the support material, the carbon black B1 from Degussa-Hüls is employed for the electrocatalyst according to the invention and the furnace black Vulcan XC-72 from Cabot Inc. is employed for the comparison catalysts.

Preparation of the Carbon Black B1

The carbon black B1 is prepared in the carbon black reactor shown in FIG. 1 by spraying the liquid and gaseous carbon black raw material in at the same point. This carbon black reactor 1 has a combustion chamber 2. The oil and gas are introduced into the combustion chamber via the axial lance 3. The lance can be displaced in the axial direction to optimize the carbon black formation.

The combustion chamber runs to the narrow zone 4. After crossing through the narrow zone, the reaction mixture expands into the reaction chamber 5.

Figure 2:
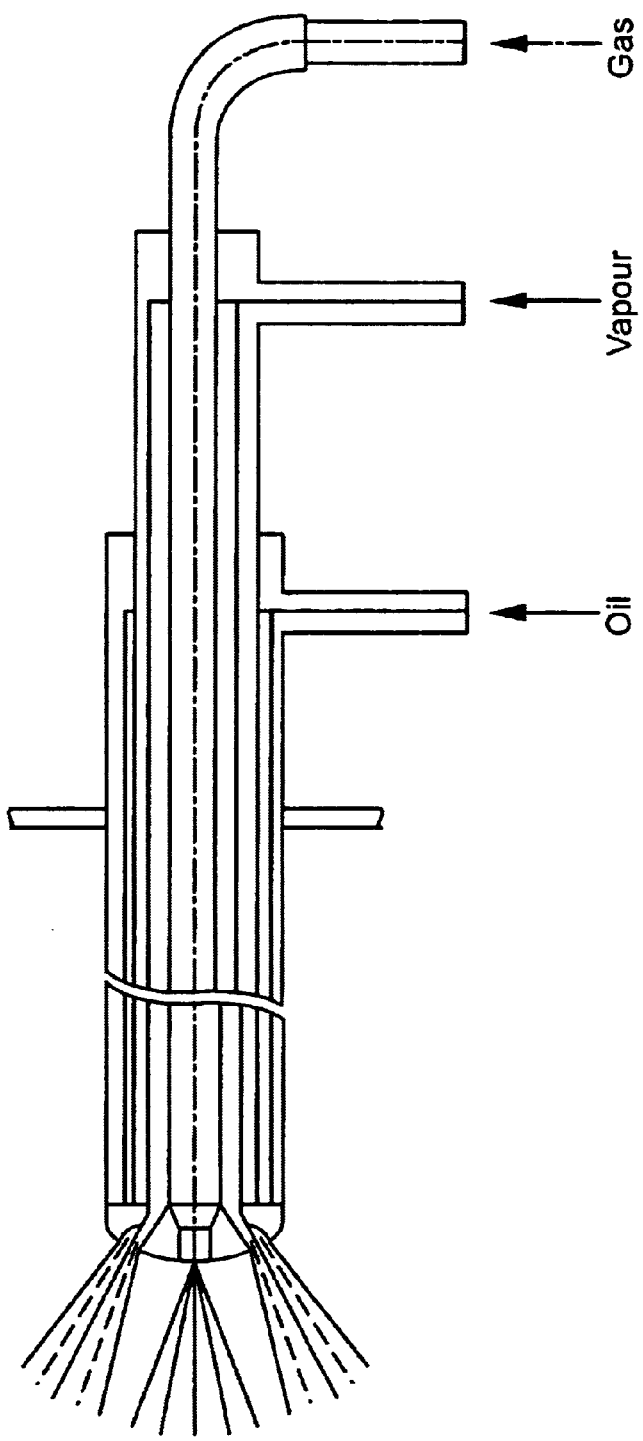
FIG. 2 is a schematic representation of the spray nozzle used in the apparatus of FIG. 1.

The lance has suitable spray nozzles on its head as shown in FIG. 2.

The combustion zone, reaction zone and termination zone which are important for the process cannot be separated sharply from one another. Their axial extension depends on the particular positioning of the lances and the quenching water lance 6.

The dimensions of the reactor used can be seen from the following list:

| | |
|---|---|
| Largest diameter of the combustion chamber: | 696 mm |
| Length of the combustion chamber to the narrow zone: | 630 mm |
| Diameter of the narrow zone: | 140 mm |
| Length of the narrow zone: | 230 mm |
| Diameter of the reaction chamber: | 802 mm |
| Position of the oil lances[1] | +160 mm |
| Position of the quenching water lances[1] | 2060 mm |

[1] measured from the zero point (start of narrow zone)

The reactor parameters for the preparation of the carbon black according to the invention are listed in the following table.

| Reactor parameters | | Carbon black |
|---|---|---|
| Parameter | Unit | B1 |
| Combustion air | Nm³/h | 1500 |
| Temperature of the combustion air | ° C. | 550 |
| Σ Natural gas | Nm³/h | 156 |
| k factor (total) | | 0.70 |
| Carbon black oil, axial | kg/h | 670 |
| Carbon black oil position | mm | +16 |
| Atomizer vapour | kg/h | 100 |
| Additive (K₂CO₃ solution) | l/h × g/l | 5.0 × 3.0 |
| Additive position | | axial |
| Reactor exit | ° C. | 749 |
| Quenching position | mm | 9/8810 |

Characterization of the Support Materials

The hydrogen contents of the two carbon blacks are determined both by CHN elemental analysis and by means of neutron diffraction. The method of inelastic neutron scattering (INS) is described in the literature (P. Albers, G. Prescher, K. Seibold, D. K. Ross and F. Fillaux, Inelastic Neutron Scattering Study Of Proton Dynamics In Carbon Blacks, Carbon 34 (1996) 903 and P. Albers, K. Seibold, G. Prescher, B. Freund, S. F. Parker, J. Tomkinson, D. K. Ross, F. Fillaux, Neutron Spectroscopic Investigations On Different Grades Of Modified Furnace Blacks And Gas Blacks, Carbon 37 (1999) 437).

The INS (or IINS—inelastic, incoherent neutron scattering) method offers some quite unique adyantages for still more intensive characterization of carbon blacks and active charcoals.

As an addition to the proven quantification of the H content by elemental analysis, the INS method enables the sometimes quite small hydrogen content in graphitized carbon blacks (approx. 100–250 ppm), carbon blacks (approx. 2000–4000 ppm in furnace blacks) and in active charcoals (approx. 5000–12000 ppm in typical catalyst supports) to be broken down into a more detailed form in respect of its bonding states.

For comparison purposes, the values of the total hydrogen content of the carbon blacks determined by means of CHN analysis (LECO RH-404 analyzer with a thermal conductivity detector) are listed in the following table. The spectra integrals standardized to the sample weight are also stated, these having been determined as follows: Integration of the range of an INS spectrum of 500–3600 cm$^{-1}$. As a result of this, the graphite vibration band of the carbon matrix at approx. 110 cm$^{-1}$ is cut out.

| Carbon black | H content [ppm] by CHN elemental analysis | H content[integral/ sample weight] by INS |
|---|---|---|
| B1 | 4580 ± 300 | 69.1 |
| Vulcan XC-72 furnace black | 2030 ± 200 | 46.5 |

The specific BET-surface area of the support materials is determined according to DIN 66 132 while their CTAB-number is determined according to ASTM D-3765.

| Carbon black | CTAB surface area [m²/g] | BET surface area [m²/g] | BET:CTAB surface area ratio |
|---|---|---|---|
| B1 | 30 | 30 | 1 |
| Vulcan XC-72 furnace black | 170 | 250 | 1.47 |

Example 1

20.1 g carbon black B1 (moisture content 0.5 wt. %) are suspended in 2000 ml of completely desalinated water. After heating to 90° C. and adjusting the pH to 9 with sodium bicarbonate, 5 g platinum in the form of hexachloroplatinic (IV) acid solution (25 wt. %Pt) are added, the suspension is brought to pH 9 again, reduction is carried out with 6.8 ml formaldehyde solution (37 wt. %) and, after filtration, the residue is washed with 2000 ml of completely desalinated water and dried at 80° C. in vacuo for 16 h. The electrocatalyst obtained in this way has a platinum content of 20 wt. %.

Comparison Example 1

Analogously to example 1, 20.0 g Vulcan XC-72 R (based on the dry weight) from Cabot are suspended in 2000 ml of completely desalinated water. The electrocatalyst is prepared in the same manner as described in example 1.

After drying in vacuo, an electrocatalyst which has a platinum content of 20 wt. % is obtained.

Example 2

A solution of 52.7 g hexachloroplatinic (IV) acid (25 wt. % Pt) and 48.4 g ruthenium (III) chloride solution (14 wt. % Ru) in 200 ml deionized water is added to a suspension of 80.4 g carbon black B1 (moisture content 0.5 wt. %) in 2000 ml completely desalinated water at room temperature, while stirring. The mixture is heated to 80° C. and the pH is brought to 8.5 with sodium hydroxide solution. After addition of 27.2 ml of a formaldehyde solution (37 wt. %), the solid is filtered off and rinsed with 2000 ml of completely desalinated water and the moist filter cake is dried in a vacuum drying cabinet at 80° C. An electrocatalyst which comprises 13.2 wt. % platinum and 6.8 wt. % ruthenium is obtained.

Comparison Example 2

Analogously to example 2, using 81.1 g Vulcan XC-72 R (moisture content 1.39 wt. %) as the catalyst support, a platinum-ruthenium catalyst which comprises 13.2 wt. % Pt and 6.8 wt. % Ru is obtained.

The synthesis of comparison example 2 is described in DE 197 21 437 under example 1.

Characterization of the Electrocatalysts

To determine the properties of the electrocatalysts, the particle size of the noble metal crystallites is first determined by means of X-ray diffraction (XRD). The article size determination was in each case carried out on the (110) reflex of the platinum at 2 theta=40°.

| Catalyst | Particle size [nm] | Lattice constant [nm] |
|---|---|---|
| Example 1 | 4.4 | 0.392 |
| Comparison example 1 | 2.3 | 0.396 |
| Example 2 | 3.8 | 0.394 |
| Comparison example 2 | 1.5 | 0.394 |

Analogously to examples 1 to 3 of DE 197 21 437, no shift in the platinum reflex in the XRD spectrum is to be observed in the bimetallic Pt—Ru catalyst, which indicates an alloy formation.

In addition to the X-radiography measurements, INS spectra (inelastic, incoherent neutron scattering) are recorded in order to determine the hydrogen content and the bonding states of the carbon in the catalyst.

The method used here is completely analogous to the methods used for characterization of the carbon blacks. It is found that the different properties of the carbon blacks Vulcan XC-72 and B1 can also be clearly detected in the catalyst. The spectra integrals, standardized to the sample weight, of the INS spectrum in the range of 750–2000 cm$^{-1}$ selected confirm this. As a result of the integration range chosen, the graphite vibration band of the carbon matrix at 110 cm$^{-1}$ is cut out.

For comparison of the materials, in addition to the graphite vibration band at 112 cm$^{-1}$ the following signals are important:

- the range of 750–1000 cm$^{-1}$ (i.e. up to the sharp separation at 1000 cm$^{-1}$); it corresponds to the "out of plane" C—H deformation vibration bands at the truncation edges of the lattice planes of the graphitic carbon black units.
- the range of 1000–1250 cm$^{-1}$; this corresponds to the "in plane" C—H deformation vibration bands
- the range of 1250–2000 cm$^{-1}$; this corresponds to the C—H deformation vibrations of non-conjugated constituents.

| Spectral range in INS | 750–1000 cm$^{-1}$ | 1000–1250 cm$^{-1}$ | 1250–2000 cm$^{-1}$ | Range A+B+C standardized to sample weight |
|---|---|---|---|---|
| Range | A | B | C | |
| Carbon black B1 | 107 | 99 | 241 | 32.3 |
| Catalyst according to example 1 | 136 | 128 | 315 | 34.9 |
| Vulcan XC-72 furnace black | 69 | 63 | 176 | 21.2 |
| Catalyst according to comparison example 1 | 105 | 105 | 264 | 22.9 |

Figure 3:
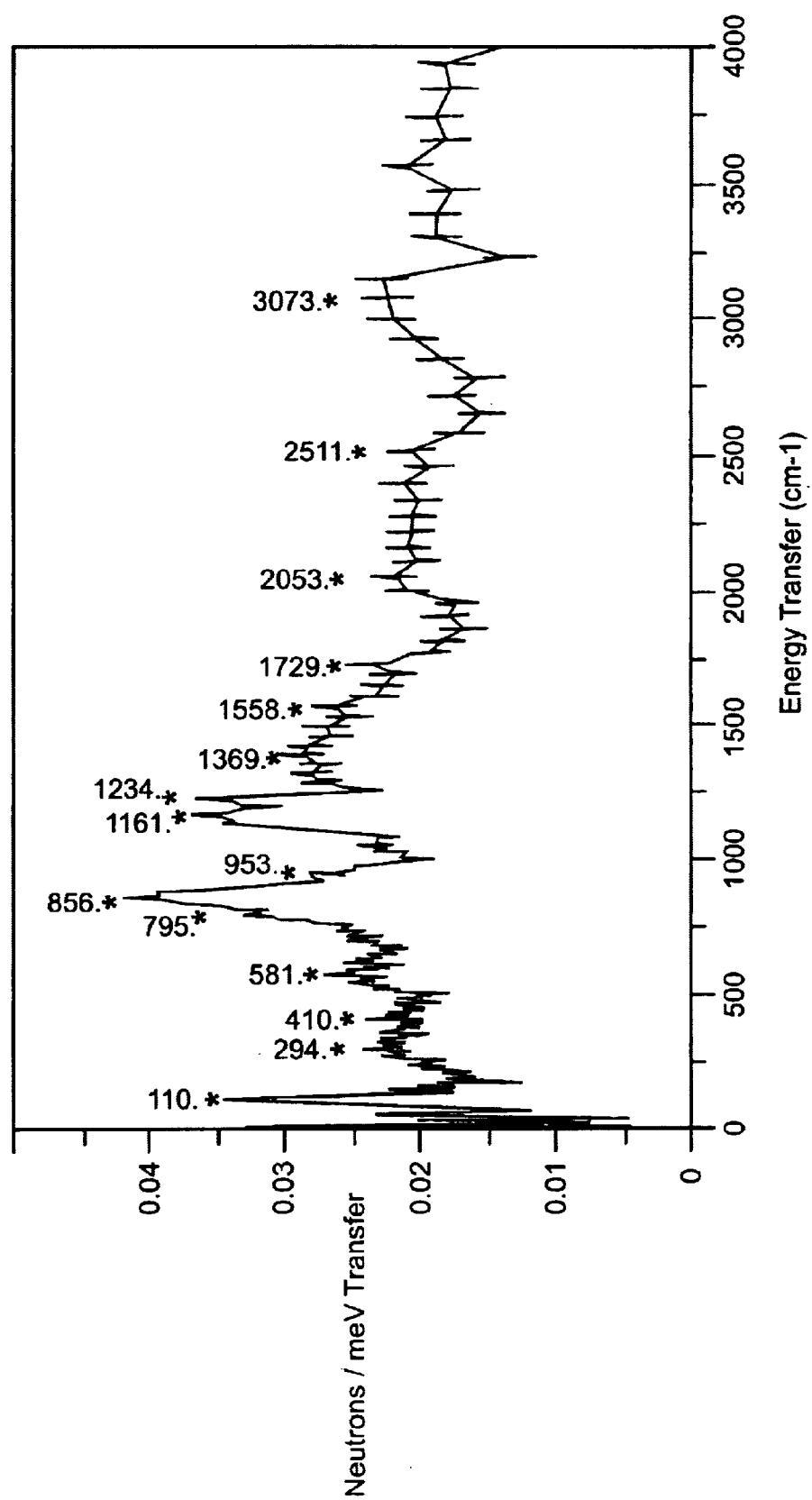
FIG. 3 is a graph showing the INS spectra of carbon black.
Figure 4:
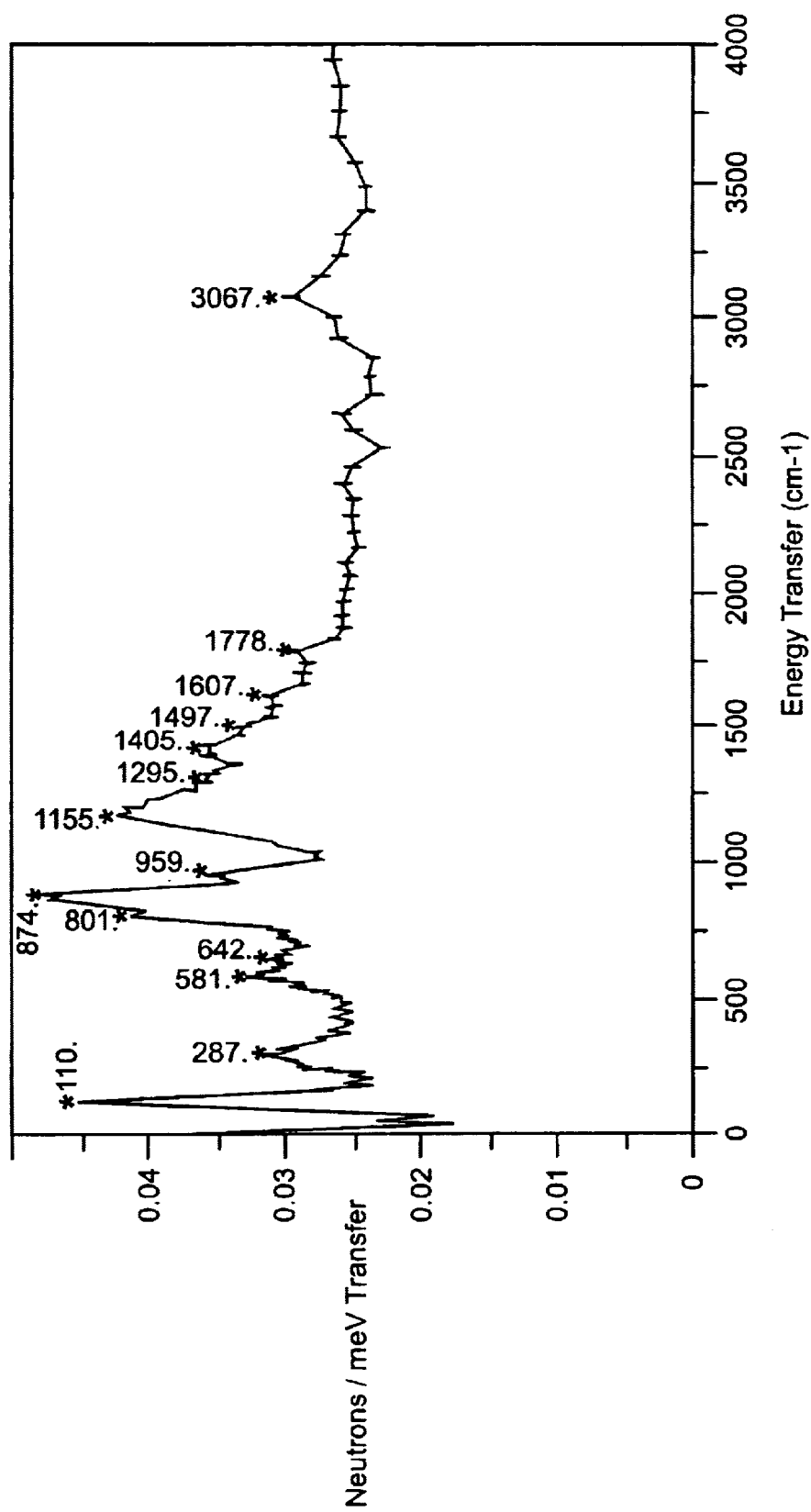
FIG. 4 is a graph of the INS spectra of the catalyst of example 1 of the present invention.
Figure 5:
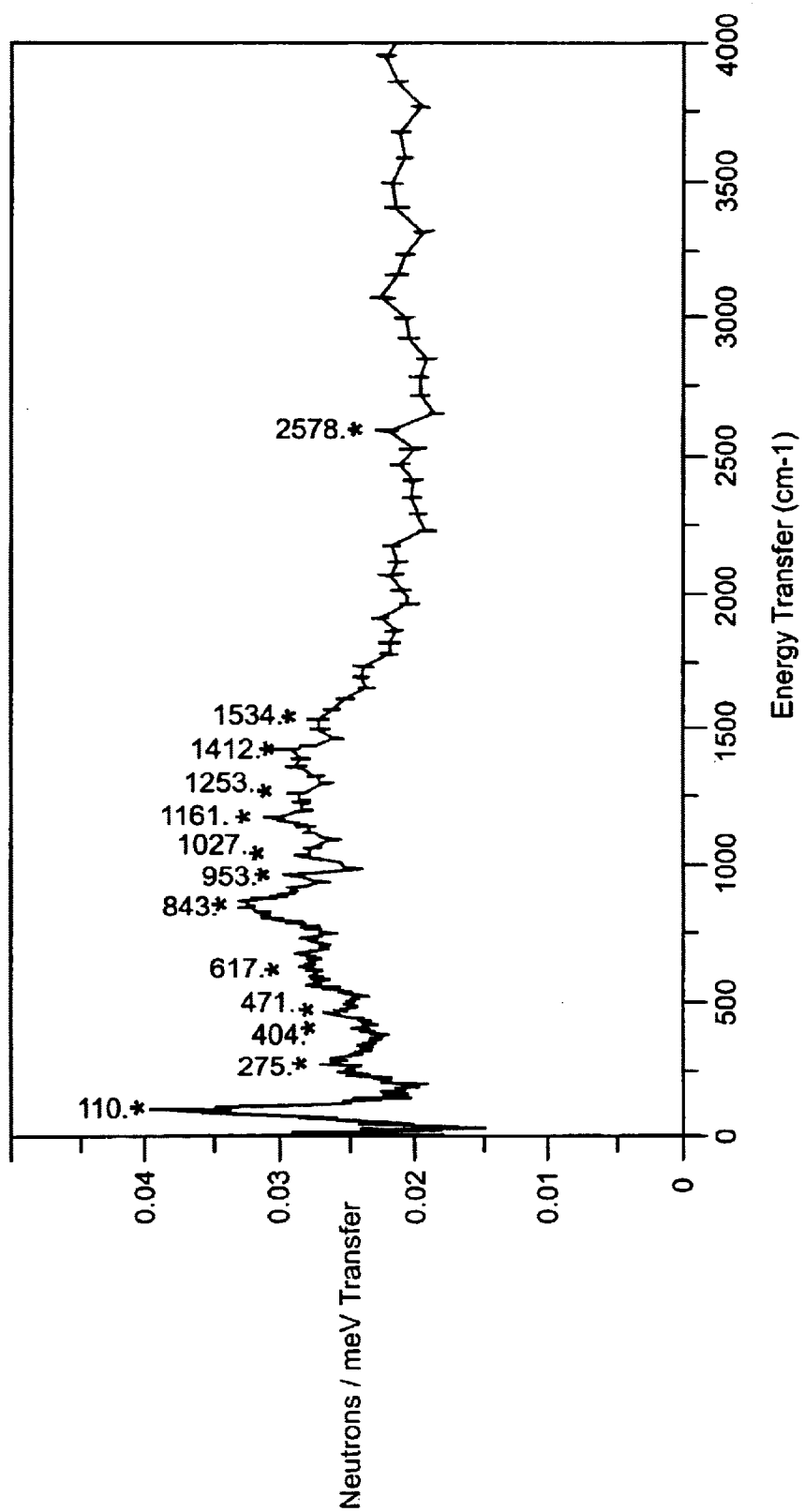
FIG. 5 is a graph of the INS spectra of another carbon black, Vulcan XC-72.
Figure 6:
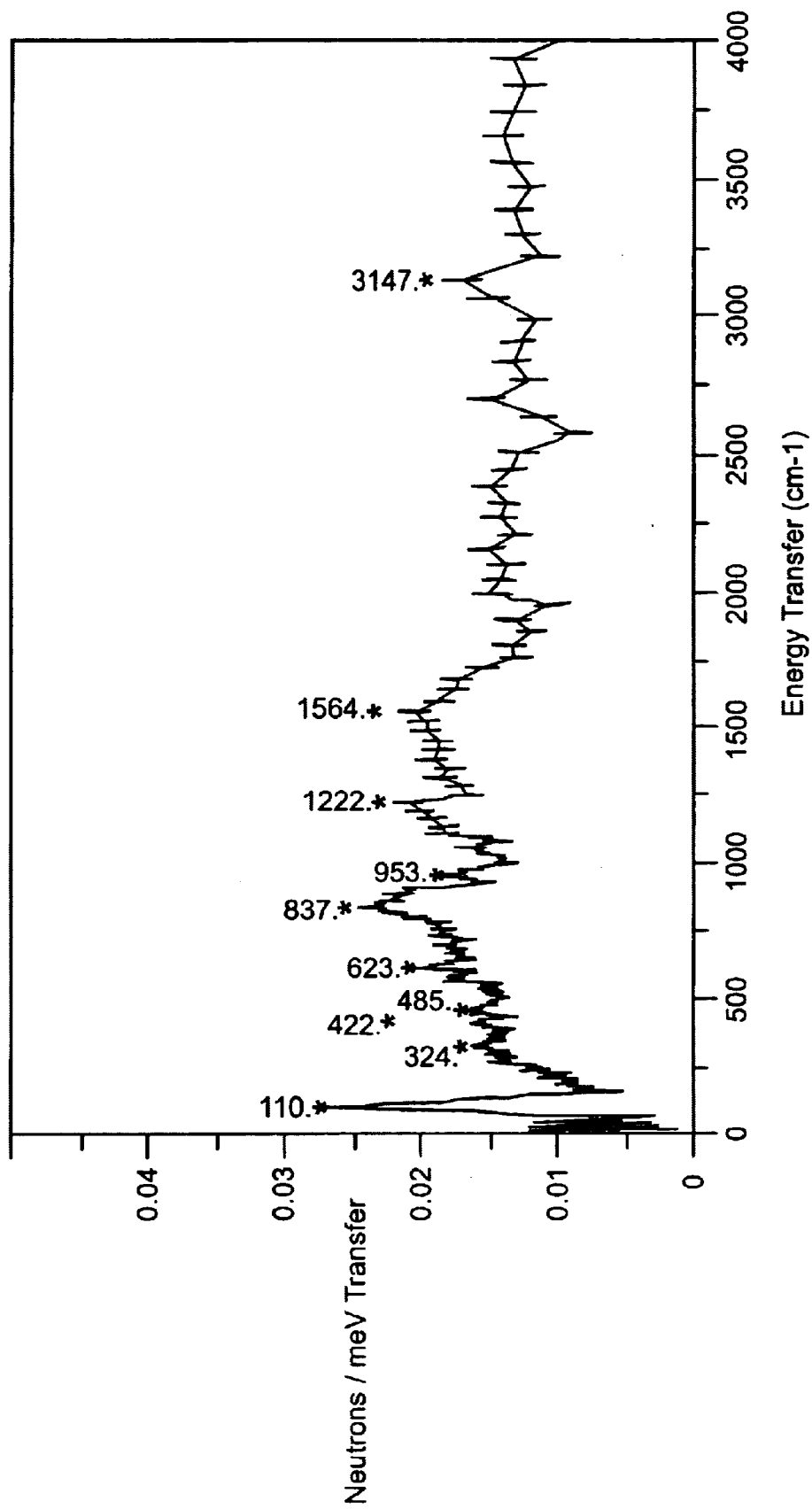
FIG. 6 is a graph of the INS spectra of a catalyst made according to comparison example 1.

FIG. 3 shows the INS spectra of carbon black B1, and FIG. 4 the catalyst according to the invention prepared according to example 1. FIG. 5 shows the INS spectra of Vulcan XC-72 furnace black, and FIG. 6 the catalyst prepared according to comparison example 1.

For electrochemical characterization, the electrocatalysts are processed to a membrane electrode assembly (MEA= membrane electrode assembly). The electrocatalyst according to the invention according to example 1 and the electrocatalyst according to comparison example 1 are characterized as cathode catalysts in hydrogen/air and hydrogen/oxygen operation. The electrocatalyst according to the invention according to example 2 and the electrocatalyst according to comparison example 2 are tested as CO-tolerant anode catalysts in reformed product/oxygen operation.

The cathode and anode catalysts are applied to a membrane with ionic conductivity (Nafion® 115) in accordance with example 1 of the process described in U.S. Pat. No. 5,861,222. The membrane coated in this way is placed between two conductively hydrophobized carbon papers (TORAY, TGC 90). The covering on the cathode and anode side is 0.25 mg platinum/cm$^2$ in each case. The membrane electrode assembly (MEA) obtained in this way is measured in a PEM individual cell (normal pressure operation, temperature 80° C.), a current density of 0.4 A/cm$^2$ being established.

For electrochemical testing of the cathode catalysts, both sides of the membrane are coated with a paste of a platinum catalyst described under example 1 or comparison example 1.

The fuel gas used is oxygen or air at the cathode and hydrogen at the anode.

| Catalyst | Cell output at 400 mA/cm$^2$ [mV] | | Cell output at 500 mA/cm$^2$ [mV] | |
| --- | --- | --- | --- | --- |
| | O$_2$ | air | O$_2$ | air |
| Example 1 | 687 | 606 | 649 | 545 |
| Comparison example 1 | 630 | 518 | 576 | 429 |

A membrane electrode assembly for testing the anode catalyst is produced completely analogously to the process according to U.S. Pat. No. 5,861,222 described for the cathode catalysts.

For this, a supported Pt—Ru catalyst prepared according to example 2 or comparison example 2 is used as the anode catalyst. A platinum catalyst prepared according to comparison example 1 is used on the cathode side in both membrane electrode assemblies.

The measurement is carried out in a PEM individual cell (operated under pressure, under 3 bar, temperature 75° C.), a current density of 0.5 A/cm$^2$ being established.

The cell voltage U in hydrogen/oxygen operation is a measure of the catalyst activity.

The voltage drop ΔU which occurs after 100 ppm CO have been metered into the fuel gas is used as a measure of the CO tolerance of the catalyst.

The following fuel gas composition in reformate/02 operation is used: 58 vol. % H$_2$; 15 vol. % N$_2$, 24 vol. % CO$_2$, 100 ppm CO, 3 vol. % air ("airbleed")

| Catalyst | H$_2$/O$_2$ operation: Cell output at 500 mA/cm$^2$ [mV] | Reformate/O$_2$ operation: Cell output at 500 mA/cm$^2$ [mV] | ΔU CO-induced voltage drop [mV] |
| --- | --- | --- | --- |
| Example 2 | 715 | 661 | −54 |
| Comparison example 2 | 686 | 620 | −66 |

The cell output is significantly increased for examples 1 and 2 compared with the particular comparison examples.

Further variations and modifications will be apparent to those skilled in the art from the foregoing and are intended to be encompassed by the claims appended hereto.

German priority application 99 116 926.9 is relied on and incorporated herein by reference.

We claim:

1. An electrocatalyst which comprises a carbon support having a carbon black with an H content in the range of 4,000 ppm to 12,000 ppm and, as the catalytically active component, platinum or bi- or multi-metallically doped or alloyed platinum.

2. The electrocatalyst according to claim 1, wherein the platinum is doped or alloyed with an element selected from the group consisting of Ru, Sn, W, Mo, Fe, V, Mn, Co, Cr, Ni, Pd, Rh, Ir and mixtures thereof.

3. The electrocatalyst according to claim 2, wherein the atomic ratio between platinum and the doping or alloying component is from 9:1 to 1:9.

4. The electrocatalyst according to claim 1, wherein platinum is present in an amount of from 5 to 80 wt. %, relative to the total weight of the catalyst.

5. The electrocatalyst according to claim 1 wherein the carbon black has a CTAB surface area of 20 to 200 m$^2$/g.

6. The electrocatalyst according to claim 1 wherein the carbon black has a DBP number of 40 to 160 ml/100 g.

7. A process for preparing the electrocatalyst according to claim 1, comprising adding a noble metal salt solution and optionally a salt solution of a doping or alloying element simultaneously, in succession or in a two-stage process after prior preparation of a noble metal precatalyst to a suspension of a carbon black with an H content in the range of 4,000 to 12,000 ppm, hydrolyzing the noble metal salt solution with a basic compound and depositing the noble metal and the doping or alloying element by reduction with a reducing agent.

8. The process for the preparation of an electrocatalyst according to claim 7, further comprising after preparation of the electrocatalyst by a wet chemistry method, a heat treatment is carried out under an inert gas or reducing atmosphere at temperatures between 0° C. and 1000° C.

9. A gas diffusion electrode for a cathode or anode side of a membrane fuel cell, comprising a porous catalyst layer on a hydrophobized conductive substrate material, characterized in that it comprises the electrocatalyst according to claim 1.

10. A catalyst-coating proton-conducting polymer membrane for membrane fuel cells, characterized in that at least one of the catalytically active layers on the cathode side and on the anode side of said membrane comprises the electrocatalyst according to claim 1.

11. A membrane electrode assembly for membrane fuel cells which comprises a proton-conducting polymer membrane and gas diffusion electrodes on either side of said membrane, characterized in that at least one of the catalytically active layers on the cathode side and on the anode side of said membrane comprises the electrocatalyst according to claim 1.

12. A membrane electrode assembly for membrane fuel cells which comprises a polymer membrane and gas diffusion electrodes on the anode side and on the cathode side of said membrane, characterized in that it comprises at least one gas diffusion electrode according to claim 9.

* * * * *